(12) United States Patent
Saaranen

(10) Patent No.: US 9,873,492 B2
(45) Date of Patent: Jan. 23, 2018

(54) FLOATING CONSTRUCTION

(71) Applicant: Waterbox Oy, Lahti (FI)

(72) Inventor: Juha Saaranen, Haukipudas (FI)

(73) Assignee: Waterbox OY, Lahti (FI)

( * ) Notice: Subject to any disclaimer, the term of this patent is extended or adjusted under 35 U.S.C. 154(b) by 44 days.

(21) Appl. No.: 14/899,573

(22) PCT Filed: Jun. 19, 2013

(86) PCT No.: PCT/FI2013/050670
§ 371 (c)(1),
(2) Date: Dec. 18, 2015

(87) PCT Pub. No.: WO2014/202821
PCT Pub. Date: Dec. 24, 2014

(65) Prior Publication Data
US 2016/0137275 A1    May 19, 2016

(51) Int. Cl.
*B63B 35/73* (2006.01)
*B63B 43/06* (2006.01)
*B63C 11/49* (2006.01)
*B63B 35/44* (2006.01)

(52) U.S. Cl.
CPC .............. *B63B 43/06* (2013.01); *B63B 35/73* (2013.01); *B63C 11/49* (2013.01); *B63B 2035/4426* (2013.01); *B63B 2207/02* (2013.01)

(58) Field of Classification Search
CPC . B63B 2035/4426; B63B 35/73; B63B 43/06; B63B 2207/02; B63C 11/48; B63C 11/49
See application file for complete search history.

(56) References Cited

U.S. PATENT DOCUMENTS

| 385,656 A | * | 7/1888 | Belisle .................. B63C 11/49 |
| | | | 114/183 R |
| 3,240,186 A | | 3/1966 | Dobell |
| 3,680,515 A | | 8/1972 | Yoneda et al. |
| 4,423,695 A | | 1/1984 | Rougerie |
| 4,565,145 A | * | 1/1986 | Mayall .................. B63C 11/49 |
| | | | 114/125 |

(Continued)

FOREIGN PATENT DOCUMENTS

| EP | 0161356 A1 | 11/1985 |
| JP | H06344977 A | 12/1994 |
| WO | 2014053693 A1 | 4/2014 |

OTHER PUBLICATIONS

Chinese Patent Office, Official Action and Search report dated Jan. 3, 2017 in the Chinese patent application No. 201380077545.6.

*Primary Examiner* — Ajay Vasudeva
(74) *Attorney, Agent, or Firm* — Berggren, Inc.

(57) ABSTRACT

A floating construction comprising a water space within the floating construction, which water space has transparent walls and/or walls containing transparent sections, and at least one open opening allowing water surrounding the floating construction to enter into the water space, and the floating construction comprising space next to the water space for spectators observing the activities taking place inside the water space, wherein the floating construction comprises a draft control system for changing water surface level inside the water space.

3 Claims, 3 Drawing Sheets

(56) References Cited

U.S. PATENT DOCUMENTS

Figure 1A:
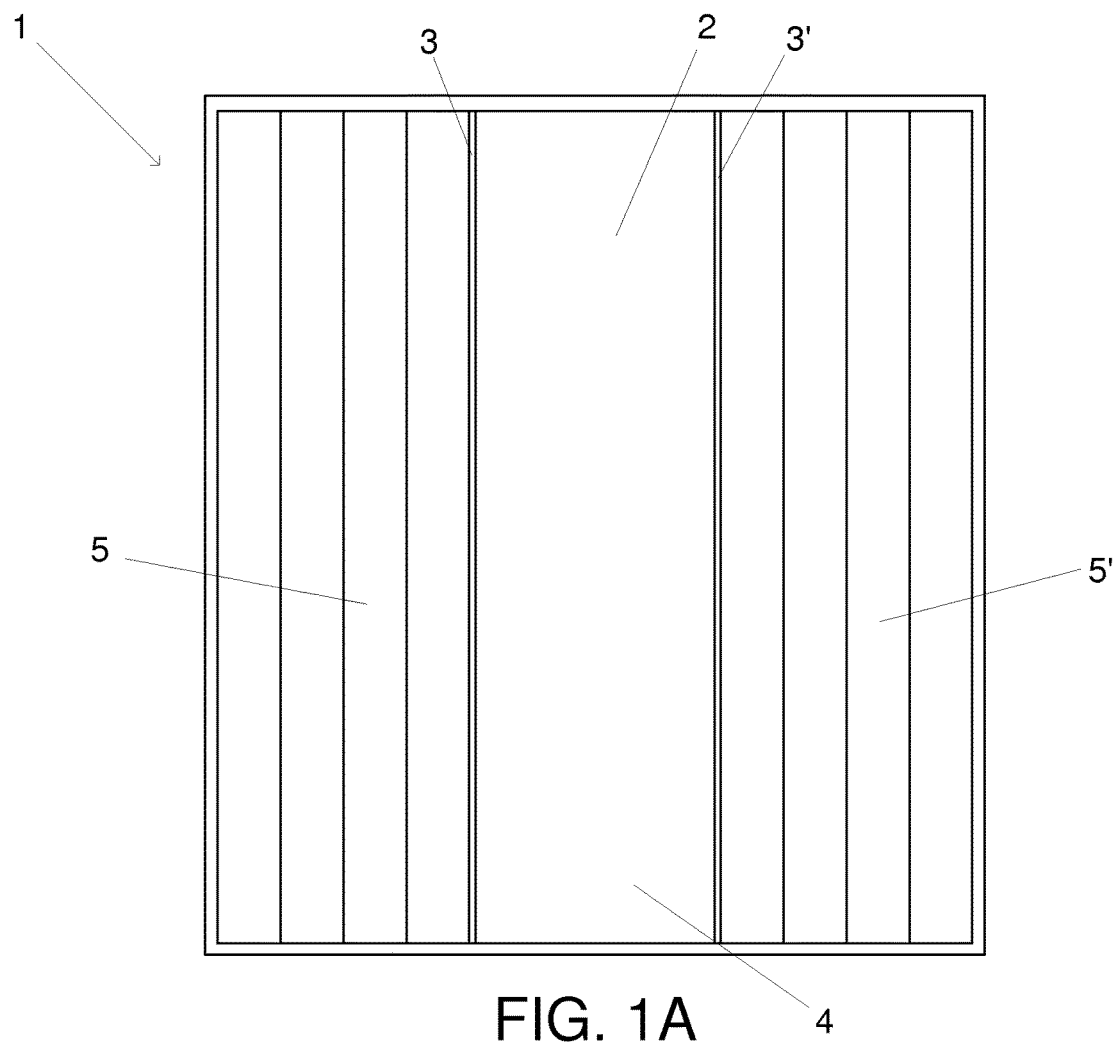

| | | | | |
|---|---|---|---|---|
| 4,854,256 A | * | 8/1989 | Hayashi | B63B 35/44 114/61.1 |
| 5,988,088 A | * | 11/1999 | Ishida | B63C 11/49 114/123 |
| 6,672,233 B2 | * | 1/2004 | Wippermann | B63B 35/44 114/264 |
| 9,289,664 B2 | | 3/2016 | Lykov | |

* cited by examiner

FLOATING CONSTRUCTION

This application is a national application of PCT application PCT/FI2013/050670, filed on Jun. 19, 2013, the content of which is incorporated herein by reference in its entirety.

The present invention relates to a floating construction, which comprises a water container with at least partially transparent walls, and space for people.

Patent application PCT/FI2012/050726 discloses an apparatus for underwater activities, which apparatus comprises a vessel partially or fully filled with water with one or more open openings for entering the vessel, where the lower portion of the vessel together with the open openings for entering the vessel are located below surface level of a body of water. The walls of the vessel are transparent, or the walls comprise sections that are transparent, which allows people to observe activities taking place inside the vessel from outside of the vessel. This application also discloses an embodiment, where the vessel is connected to a floating platform to provide a floating construction. Further, this application also shortly mentions a possibility for providing room for spectators inside the walls of the vessel.

Patent application PCT/FI2012/050942 discloses a floating construction, which comprises a vessel partially or fully filled with water, with transparent walls or with walls comprising transparent section, and with at least one opening allowing the water surrounding the floating construction to enter the vessel. In the floating construction there is a space provided around or partially around the vessel for people to observe activities taking place inside the vessel, which space is enclosed to provide interior observation area. This application also mentions a system for adjusting the draft of the floating construction.

The present invention provides a simple floating construction that can be utilized for providing an arena for water and underwater activities, for example.

In the present invention a floating construction comprises a water space within the floating construction, which water space has transparent walls and/or walls containing transparent sections, and at least one open opening allowing water surrounding the floating construction to enter and exit the water space, and the floating construction comprises space next to the water space for spectators observing the activities taking place inside the water space. The floating construction also comprises a draft control system for changing water surface level inside the water space.

Advantageously the at least one open opening is opening formed in the bottom surface of the floating construction, and the size and the location of the opening corresponds substantially the area restricted by the walls of the water space.

Advantageously the space for spectators comprises auditorium structure at least on opposite sides of the water space, or around the water space.

Advantageously the floating construction of the invention has a cylindrical form, wherein the space for spectators is formed as an auditorium structure surrounding the water space.

In a floating construction of the present invention the draft control system advantageously comprises ballast tanks located within the floating construction, and a pumping system for adding and removing water from the ballast tanks.

A floating construction of the present invention may also be equipped with a suitable propulsion system for moving the construction on water.

A floating construction of the present invention is advantageously equipped with an anchoring system for securing the construction on water.

The features defining a floating construction according to the invention are presented more precisely in claim 1. Other advantageous embodiments and features are presented in dependent claims.

Figure 1B:
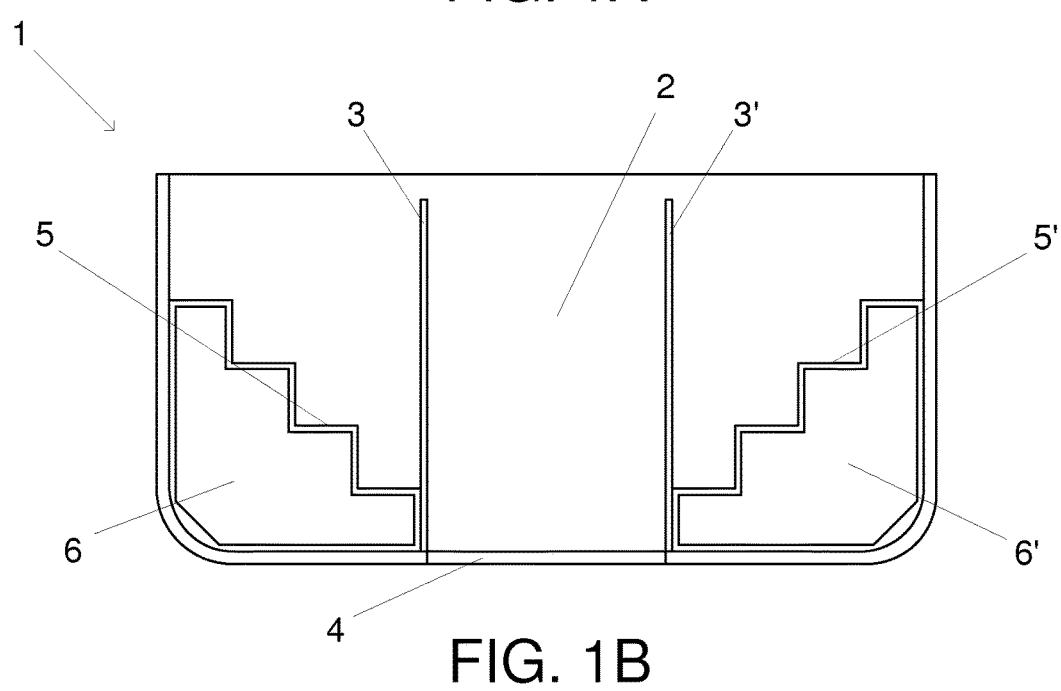
Figure 2A:
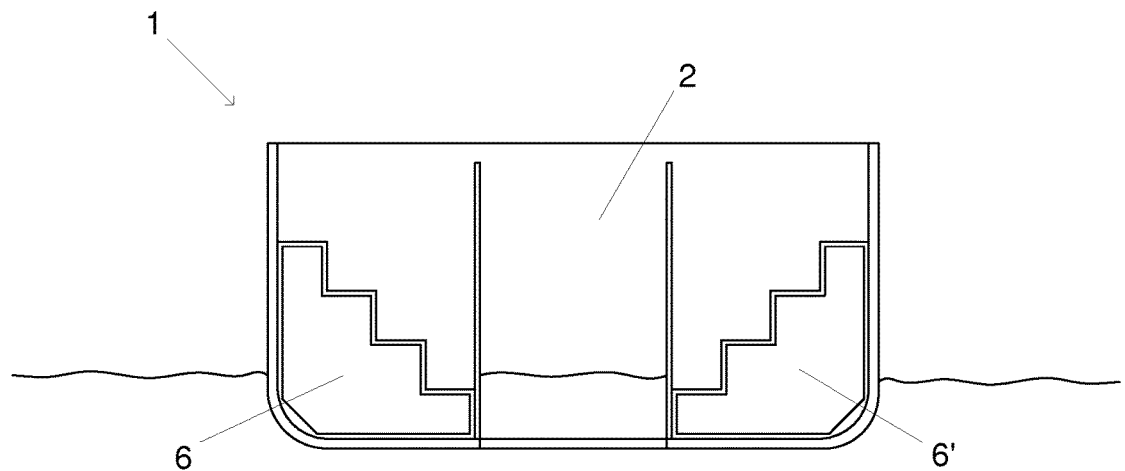
Figure 2B:
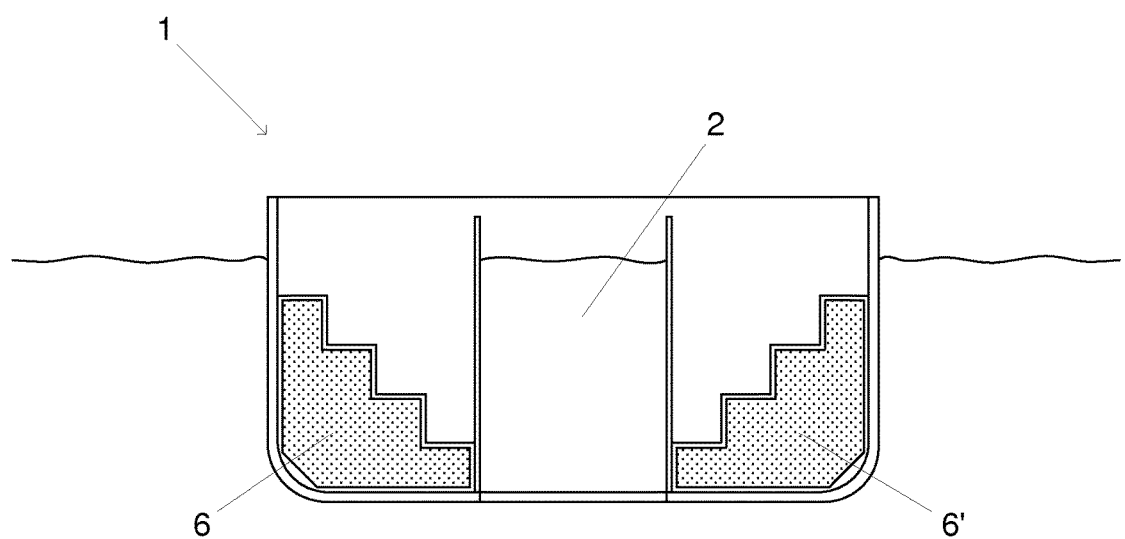
Figure 3A:
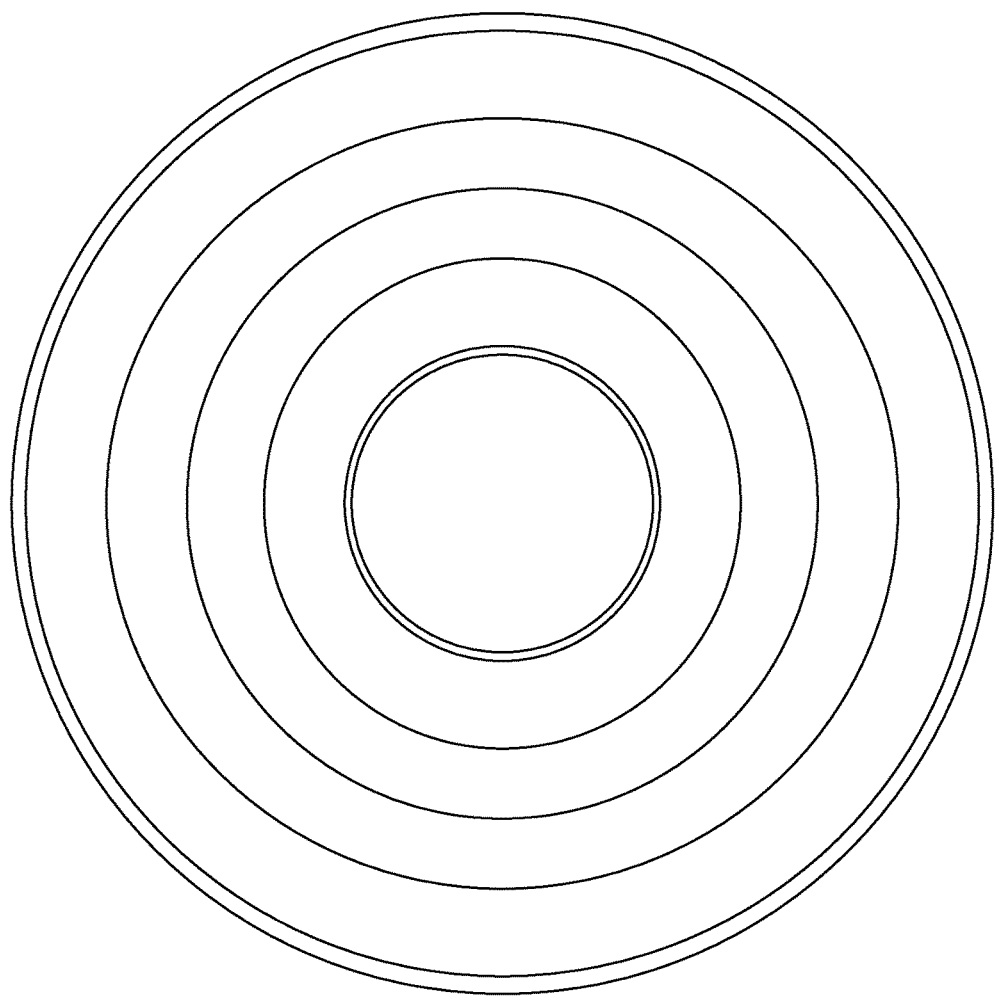
Figure 3B:
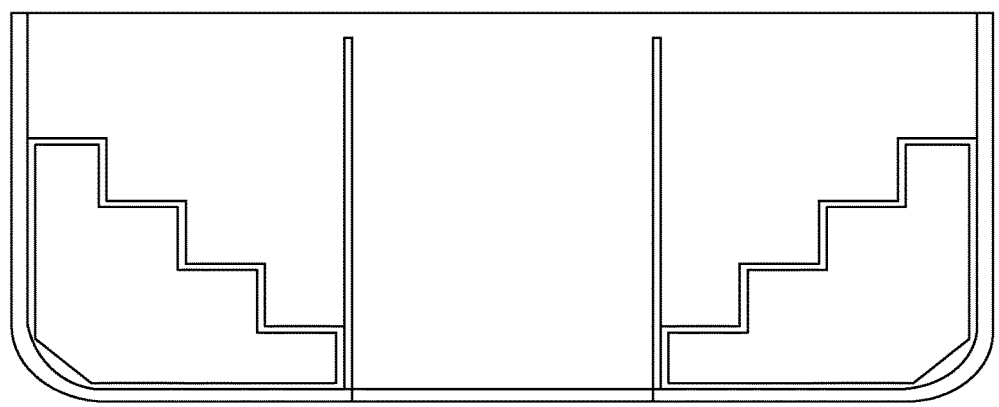

Exemplifying embodiments of the invention and their advantages are explained in greater detail below in the sense of example and with reference to accompanying drawings, where:

FIG. 1A shows schematically a top view of an embodiment of a floating construction according to the invention, FIG. 1B shows schematically a cross-sectional view of the embodiment of FIG. 1A, FIGS. 2A and 2B show the floating construction of FIGS. 1A and 1B in different floating positions, and FIGS. 3A and 3B show schematically an alternative embodiment of a floating construction of the invention.

The embodiment of a floating construction 1 of the invention shown schematically in cross-sectional view in FIG. 1 comprises a water space 2 formed within the floating construction. The water space 2 is restricted from other areas of the floating construction 1 by vertically extending transparent walls 3, 3'. The lower edges of the transparent walls 3, 3' are connected watertightly around the edges of an opening 4 formed on the bottom of the floating construction 1 so that the area of the opening 4 corresponds the area of the water space 2.

On both sides of the water space 2 and opposite each other are formed seating arrangements 5, 5' for spectators in form of auditoriums, from where the spectators can follow activities taking place in the water space 2.

Under the seating arrangements 5, 5' is formed ballast tanks 6, 6' which are used to control and adjust the draft of the floating construction 1 by adding and/or removing water from the ballast tanks. Since water in the water space 2 has direct contact to water surrounding the floating construction 1 through opening 4, water surface level of the water surrounding the floating construction is in the same level than the water surface level of the water in the water space. Therefore changing the draft of the floating construction 1, that is the depth in which the floating construction floats in the surrounding water, also directly changes the water surface level inside the water space 2.

The ballast tanks 6, 6' are part of the draft control system of the floating construction 1, which system also comprises suitable pumps and valves for pumping water to the ballast tanks and removing water from the ballast tanks. Further, the draft control system also advantageously comprises suitable means for monitoring the water surface level of the surrounding water with respect to the floating construction. These monitoring means can be infrared or laser based distance measurement sensor, or sensors connected to floats, for example. This way the draft control system can also compensate for the weight of the spectators when keeping the draft of the floating construction at pre-set level.

FIGS. 2A and 2B show the floating construction 1 of FIGS. 1A and 1B in different floating positions.

In the position of FIG. 2A, the ballast tanks 6, 6' are empty and the draft of the floating construction 1 is created by the weight of the construction only. In this floating position the draft of the floating construction 1 is at its minimum, and the water surface level at the water space 2 is at its lowest level. This floating position is suitable for moving the floating constructions 1 to different locations over water by towing or by a suitable propulsion system which can be part of the floating construction. Suitable propulsion system may be engines with propellers or water jet propulsion system, for example.

In the position of FIG. 2B the ballast tanks 6, 6' are filled and the draft of the floating construction is adjusted to be suitable for the use of water and underwater activities taking place within the water space 2 as well as for observation of these activities outside of the water space. In this position the floating construction can be either anchored to the bottom of the surrounding body of water with a suitable anchoring system, or fixed to a suitable pier, for example, for securing it in its place on water.

The floating construction of the invention may also be equipped with suitable roof or canopy for providing shade from sun and/or protection from rain at least to the spectators.

In the embodiment of the figures the water space 2 is formed only by vertically extending walls without top surface. The water space may also be provided with suitable top surface, but the top surface must allow air to escape from and enter to the water space, so that the water surface level within the water space can be freely adjusted simultaneously with the draft of the floating construction 1.

FIGS. 3A and 3B show schematically an alternative embodiment of a floating construction of the invention, where FIG. 3A is a top view and FIG. 3B is a cross-sectional view of the embodiment.

As can be seen from FIG. 3B, this embodiment substantially corresponds to the embodiment of FIG. 1B, but the floating construction is formed in cylindrical form, as can be seen from FIG. 3A.

In the embodiment of FIGS. 3A and 3B the water space in located in the center of the floating construction, and the space for spectators is formed as an auditorium surrounding the water space.

The specific exemplifying embodiments of the invention shown in figures and discussed above should not be construed as limiting. A person skilled in the art can amend and modify the exemplary floating construction described above in many evident ways within scope of the attached claims. Thus the invention is not limited merely to the embodiments described above.

The invention claimed is:

1. A floating construction comprising a bottom surface and a water space within the floating construction, which water space is surrounded by transparent walls, and at least one open opening allowing water surrounding the floating construction to enter into the water space, and the floating construction comprising space for spectators adjacent to the water space for observing the activities taking place inside the water space, wherein the floating construction comprises a draft control system having ballast tanks for changing water surface level inside the water space and the space for spectators comprises seating arrangements for spectators in form of auditorium structure and the at least one open opening is opening formed in the bottom surface of the floating construction, and size and location of the opening corresponds substantially the area restricted by the walls of the water space, wherein the ballast tanks are supported on the bottom surface of the floating construction under the seating arrangement.

2. A floating construction according to claim 1, wherein the auditorium structure is at least on opposite sides of the water space.

3. A floating construction according to claim 1, wherein the floating construction has a cylindrical form, and the auditorium structure surrounds the water space.

* * * * *